United States Patent [19]

Sparr

[11] 3,810,521

[45] May 14, 1974

[54] ANTI-FISHTAIL DEVICE FOR TRAILERS

[76] Inventor: Albert E. Sparr, Cutter Rd., Meadville, Pa. 16335

[22] Filed: Aug. 18, 1970

[21] Appl. No.: 64,684

[52] U.S. Cl............... 180/103, 280/446 B, 188/112
[51] Int. Cl............................................... B60t 7/20
[58] Field of Search ............ 280/432, 446; 180/103; 188/112, 158, 3; 303/7

[56] References Cited
UNITED STATES PATENTS

| | | | |
|---|---|---|---|
| 2,152,017 | 3/1939 | Banning | 188/112 |
| 2,856,036 | 10/1958 | Mullen | 188/112 |
| 3,574,414 | 4/1971 | Jacob | 188/3 |
| 3,101,959 | 8/1963 | Adams | 280/432 |
| 3,486,799 | 12/1969 | Greentree | 188/3 |
| 2,768,837 | 10/1956 | Prater | 280/446 B |
| 2,846,028 | 8/1958 | Gunther | 188/267 |
| 3,512,803 | 5/1970 | Hines et al. | 280/446 B X |
| 3,531,139 | 9/1970 | Hedgepath | 280/446 B |

*Primary Examiner*—Kenneth H. Betts

[57] ABSTRACT

The specification discloses an anti-fishtail device for trailers. The device operates on the fact that application of the trailer brakes only will stop the fishtail of a trailer once it starts. An electric pickup is supported on the trailer coupler which is in turn secured to the frame of the automobile. It is actuated by the relative angular movement between the trailer and the towing vehicle. The apex of this angle is the center of the ball coupler on the hitch. This relative movement causes the pickup to send a signal through suitable circuitry to an amplifier which is connected to the electrical brakes of the trailer. The system, in effect, measures the rate of change of angle between the trailer and the vehicle and provides corrective action proportional to the disturbance.

7 Claims, 6 Drawing Figures

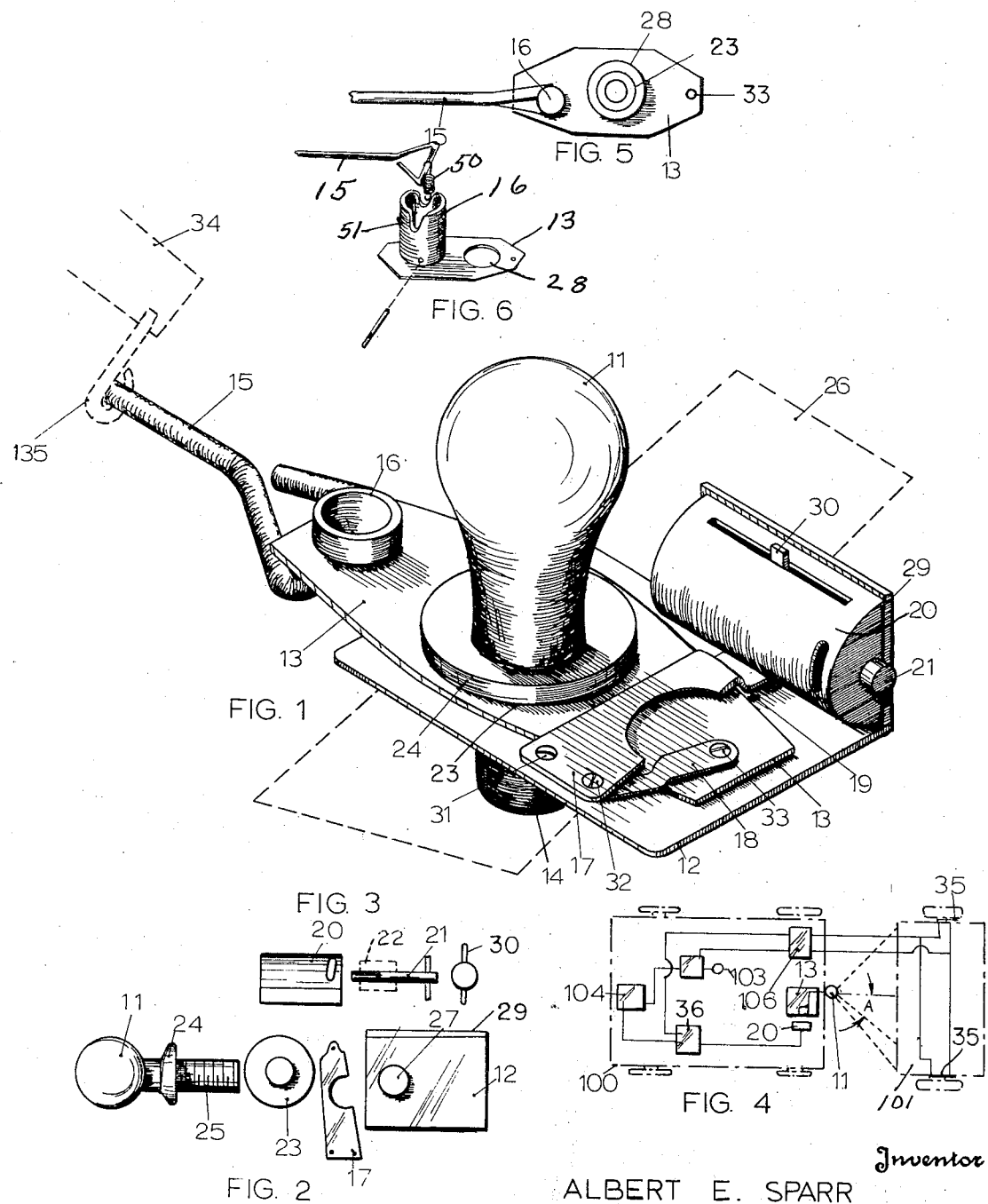

ANTI-FISHTAIL DEVICE FOR TRAILERS

GENERAL DESCRIPTION OF THE INVENTION

Most trailers equipped with brakes (electric, hydraulic or air) have a hand-operated control provided in the towing vehicle which permits the driver to apply the trailer brakes independently of the car brakes if he wishes. Standard instructions are that in event of a fishtail the operator should apply the trailer brakes only, and thereby stop the disturbance. If the operator is quick enough to react he will be successful in regaining control. The problem comes in that under certain emergency conditions too many drivers detect the fishtail too late and take proper corrective action even later. The device electrically measures the rate at which the angle between the car and trailer changes. This can be done by a number of electro-mechanical or electro-optical devices. When a permanent magnet is moved inside a coil, the magnetic lines of force cut the turns of the coil and generate a voltage in the coil. This voltage is proportional to the velocity at which the magnet is moved through the coil. Thus, in the device disclosed herein, when the magnet moves relative to the coil, the polarity of this signal reverses when the directional movement of the magnet relative to the coil is reversed in a well known manner. Thus the frequency of the signal generated by the movement of the coil and magnet relative to each other generates a signal of a frequency proportional to the movement and, since the relative movement is generated by the swinging action of the trailer relative to the towing movement, the frequency of polarity reversals of the voltage is directly proportional to the fishtailing oscillations of the trailer. These signals are fed into an electronic circuit which will reject signals that are of a low frequency but will use voltages that are of a higher frequency. Signals generated as a result of normal turns or resulting from parking maneuvers are rejected by the circuit because they are of a very low frequency and a low voltage because of the low relative velocity of movement between the coil and the magnet. Any signal that results from a fishtail is of a higher frequency or high number of trailer swings per second, it will automatically apply the trailer brakes at the instant the fishtail starts and thereby prevents it from building up to dangerous proportions. The brakes are applied lightly in a slight fishtail, which generates a low voltage signal of a low frequency, and heavily in a bad oscillation, which generates a voltage of a high magnitude and a high frequency. The embodiment disclosed uses a magnet actuated by the change in angle between the car and trailer. The magnetic field of the moving magnet induces a voltage in a coil. The voltage induced in the coil is by the relative movement between the magnet and the coil which causes the magnetic lines of force from the magnet to cut the turns of the coil in a manner familiar to those skilled in the art. This signal is then introduced into an electronic network for an adjustable period of time during which it fires a linear amplifier which in turn turns on the trailer brakes. The linear amplifier and the electronic filter are both made in accordance with principles familiar to those skilled in the art. The amplifier can feed directly into electric brakes or operate a control system to control hydraulic brakes or mechanical brakes. When the magnet stops moving or moves slowly, as in a normal high speed turn, the induced voltage is not great enough to turn on the brakes.

A simple mechanical linkage system permits large angles between car and trailer without reducing sensitivity of the transducer in the critical angle each side of neutral.

STATEMENT OF INVENTION

This invention relates to anti-fishtail devices and, more particularly, to anti-fishtail devices for trailers and for trailers towed by other trailers.

OBJECTS OF THE INVENTION

It is an object of the invention to provide a device that will detect the beginning of a fishtail automatically and to automatically take corrective action before the average driver would be able to do so. When the fishtailing stops, the corrective action is automatically removed. The corrective action applied is proportional to the magnitude of the fishtail.

It is another object of the invention to provide an improved anti-fishtail device.

Another object of the invention is to provide an anti-fishtail device for trailers and the like.

Another object of the invention is to provide an anti-fishtail device which is simple in construction, economical to manufacture, and simple and efficient to use.

Another object is to provide a device actuated by rate of relative movement of the towed vehicle versus the towing vehicle to actuate a member.

DESCRIPTION OF THE DRAWINGS

FIG. 1 is an isometric view of the apparatus for supporting the pickup on the towing coupler and for actuating it.

FIG. 2 is an exploded view of some of the parts shown in FIG. 1.

FIG. 3 is an exploded view of some of the parts of the assembly.

FIG. 4 is a schematic wiring diagram of the device according to the invention installed on a typical trailer and towing vehicle.

FIG. 5 is an exploded view of a part shown in FIGS. 1 and 2.

FIG. 6 is another exploded view of some of the parts shown in FIGS. 1 and 2.

DETAILED DESCRIPTION OF THE DRAWINGS

Now with more particular reference to the drawings, the apparatus for applying the fishtail device includes the hitch ball 11 which will be of the conventional type which is familiar to those skilled in the art. The fixed plate 12 is supported on the trailer hitch by removing the conventional hitch ball 11 which may be first removed at its threaded end 25 and supported on the movable plate 13 above the fixed plate. The hitch ball may be first removed then the threaded part 25 of the hitch ball be inserted through washer 23 and through the hole 28 in plate 13. Washer 22 rests in hole 28 in lever 13. The nut 14 is then put in place on the hitch ball threaded end 25 for holding the assembly in position on the hitch coupler which is mounted on the tow vehicle.

The pickup 20, 21, 29 and 30 which may be a type having a suitable fixed coil (shown in dotted lines at 22 in FIG. 3) and a small magnet armature 21 referred to as an actuating member is supported on the upwardly extending leg 29 of the plate 12. The pickup 20 has a permanent magnet armature 21 having an end that extends out from the end of the pickup and the lower end of member 30 extends down through the bottom of the pickup and is attached to the lever 17. Lever 17 is pivoted to plate 12 at 31 and is connected to link 18 at 32. Link 18 is pivoted to the movable plate 13 at 33. The eye bolt 135 is attached to the trailer tongue 34 and the handle 15 extends through the eye of eye bolt 135. When the trailer sways relative to the towing vehicle, the handle 15 rotates the plate 13 around the washer 23 and threaded member 25 of the hitch ball. This causes link 18 to swing lever 17 around its pivot 31 thereby causing the permanent magnet armature 21 to reciprocate in the pickup magnet which makes up the armature 21 inside the coil in the support 20. The permanent magnet armature produces a magnetic field which cuts the turns of the pickup coil that surrounds it. The magnetic field thus induces an alternating current voltage in the pickup coil of a frequency that is proportional to the frequency of reciprocation of armature 21 in the coil. The coil voltage thus generated will be fed to the amplifier 36 which will transmit the signal to the brake actuating member 35 and apply the trailer brake. Since the amplifier 36 has suitable electronic circuitry, the trailer can follow the vehicle around curves without application of the brakes since this movement of armature 21 of pickup 20 will be of low frequency and velocity. Also, the magnitude of the signal generated by the fishtail will be proportional to the velocity and frequency of fishtail oscillation and will therefore cause the trailer brakes to be applied proportional to the magnitude and/or frequency of the fishtail. When the fishtailing stops, the brakes are automatically de-energized.

FIG. 4 shows a towing vehicle 100 and a trailer 101 connected by hitch ball 11. The hand control 103 connects to amplifier 36 which is in turn connected to battery 104. A plug disconnect of a conventional type is shown at 106. The transducer is shown at 20.

Other transducers than those shown which use piezoelectric crystals, resistance elements, strain gauges or capacitors could all be adapted with suitable circuitry to measure rate of change of angle and be programmed to provide fishtail detection and corrective action. In the form shown, a linear D.C. amplifier and suitable circuitry is used. A.C. or other types of amplifiers could be adapted.

The mechanical linkage shown here insures adequate movement of the magnet when the angle between the trailer and towing vehicle changes by plus or minus 1° to 2°. This angle is adequate for following curves on highways and for detecting fishtails. During parking operations, this angle A may approach 45°. To permit this angle, the lever 15 is held by a spring 50 in a cam 51 built into item 16. When the trailer versus towing vehicle angle exceeds 2° to 3° (only during parking at very low speeds), lever 15 follows the cam 51 in item 16 to permit the greater angle. When the trailer and tow car again get on the highway or in line, the lever 15 automatically settles back into the normal operating position for fishtail detection.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. An anti-fishtail device for trailers having brakes actuated by a suitable medium with suitable interface devices comprising a pickup member having a movable actuating member,
   means for connecting said pickup and said actuator to a towing vehicle and to a trailer whereby said actuating member is moved when said towing vehicle turns relative to said trailer,
   and connecting means connecting said pickup to said trailer brakes whereby said pickup is actuated and sends a signal to said trailer brakes through said connecting means when said trailer sways relative to said towing vehicle at a predetermined rate, and sends no signal to said trailer brakes when said trailer sways relative to said towing vehicle at less than said predetermined rate.

2. The device recited in claim 1 wherein said medium is electricity.

3. The device recited in claim 1 wherein said means connecting said pickup to said brakes comprises an electronic device,
   said pickup passes signals to said electronic device when the rate of angle change between said trailer and said vehicle exceeds a predetermined rate.

4. An anti-fishtail device for trailers comprising,
   a transducer adapted to be supported on a trailer and towing vehicle combination,
   said transducer having means to produce an electric signal of a magnitude and frequency in proportion to the rate of change of the angle between said trailer and said towing vehicle,
   and means on said trailer brakes to receive said signal and to apply said trailer brakes proportionally to the signal when said signal reaches a predetermined magnitude, and to automatically release said brakes when need for this corrective action is no longer needed.

5. An anti-fishtail device comprising a transducer, means for supporting said transducer on a towing vehicle, means connecting the actuating device of said transducer to said trailer whereby said transducer produces an output proportional to the relative magnitude and velocity of change of angle between said trailer to said towing vehicle, means connecting the output of said transducer to the actuating means on the trailer brakes whereby said brakes are applied and said fishtailing is stopped, after which said brakes are automatically released, said means supporting said transducer comprising a support plate having means for attaching it to a trailer hitch,
   a movable plate,
   means supporting said movable plate on said hitch,
   said transducer supported on said movable plate and means connecting said movable plate to said trailer whereby said movable plate is moved by said trailer in proportion to the magnitude and frequency of movement of said trailer relative to said towing vehicle,
   and means connected to and actuated by said signal to apply said trailer brakes.

6. An anti-fishtail device recited in claim 5 comprising a mechanical linkage sensitive to small angles between trailer and towing car for fishtail detection and which is insensitive to 45° angles between trailer and towing car while parking or moving said vehicles at low speeds.

7. The anti-fishtail device recited in claim 6 wherein said transducer is supported on said trailer by means of a plate having a trailer hitch ball member extending through it, a pickup member supported on said plate, and means connectable to said trailer whereby the said pickup is actuated when said trailer sways at a predetermined rate.

* * * * *